United States Patent [19]

Ahner et al.

[11] 4,421,998

[45] Dec. 20, 1983

[54] COMPACT ALTERNATOR FOR A SELF-CONTAINED ON-BOARD ELECTRIC NETWORK, PARTICULARLY FOR AN AUTOMOTIVE VEHICLE

[75] Inventors: Peter Ahner, Ludwigsburg; Helmut Harer, Remseck; Siegfried Schustek, Immenstaad, all of Fed. Rep. of Germany

[73] Assignee: Robert Bosch GmbH, Stuttgart, Fed. Rep. of Germany

[21] Appl. No.: 438,413

[22] Filed: Nov. 1, 1982

[30] Foreign Application Priority Data

Nov. 6, 1981 [DE] Fed. Rep. of Germany ....... 3144063
Mar. 2, 1982 [DE] Fed. Rep. of Germany ....... 3207385

[51] Int. Cl.³ ............................................. H02K 11/00
[52] U.S. Cl. .............................. 310/68 R; 310/68 D; 310/263
[58] Field of Search ................... 310/68 R, 68 D, 168, 310/263, 75 R, 78, 90

[56] References Cited

U.S. PATENT DOCUMENTS 3,868,521 2/1975 Schlicker et al. ............ 310/68 R X
4,087,713 5/1978 Binder ......................... 310/68 R X

FOREIGN PATENT DOCUMENTS 2935929 of 1981 Fed. Rep. of Germany .

*Primary Examiner*—Donovan F. Duggan
*Attorney, Agent, or Firm*—Frishauf, Holtz, Goodman & Woodward

[57] ABSTRACT

To reduce the axial length of an alternator, so that it can be attached, for example, to the end wall (10) of an automotive engine having a stub shaft (11) projecting therefrom, a transmission housing, clutch housing, or the like, a support structure (22, 122) has ring-shaped axially extending portions (23, 45, 145) the outer ones of which retain the armature (12, 13) typically three phase, and the inner one retains the outer races of ball bearings (35, 36; 76a, 135, 136), the inner races of which are secured to axially inwardly extending portions (31, 131) of a claw pole rotor having claw poles rotating within the gap formed by a field structure (20, 120) and the stationary windings so that the ring-shaped axial inner projection (45, 145) of the support structure interengages and overlaps the axially extending inner projection (31, 131) of the claw pole structure, and the ball bearings are placed in essential alignment with the stator core and the field core, and positioned within two parallel planes (37, 38) defined by the end portions of the armature windings (13).

26 Claims, 10 Drawing Figures

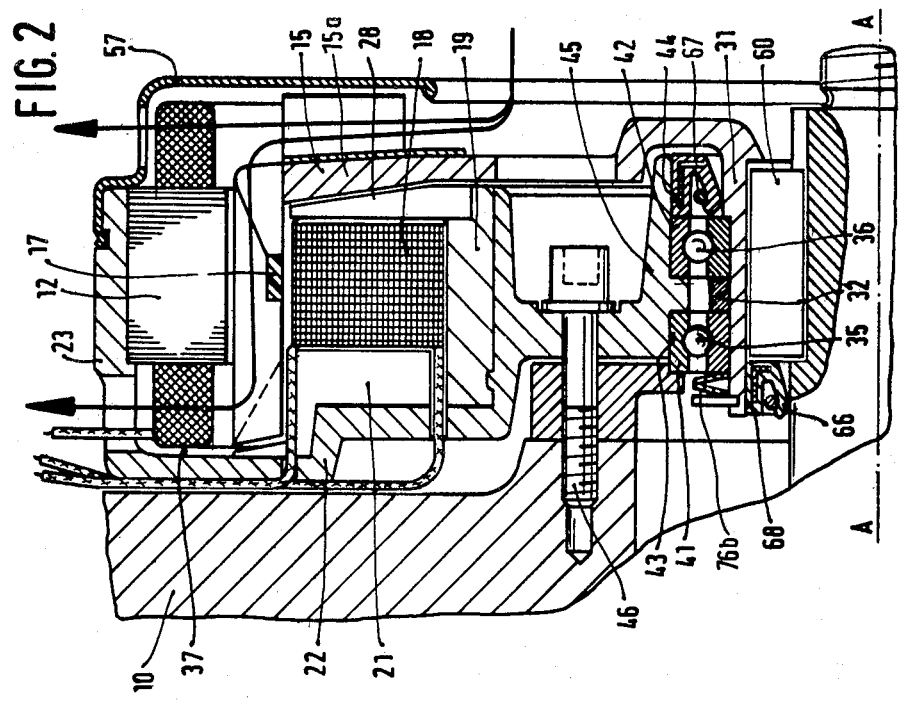
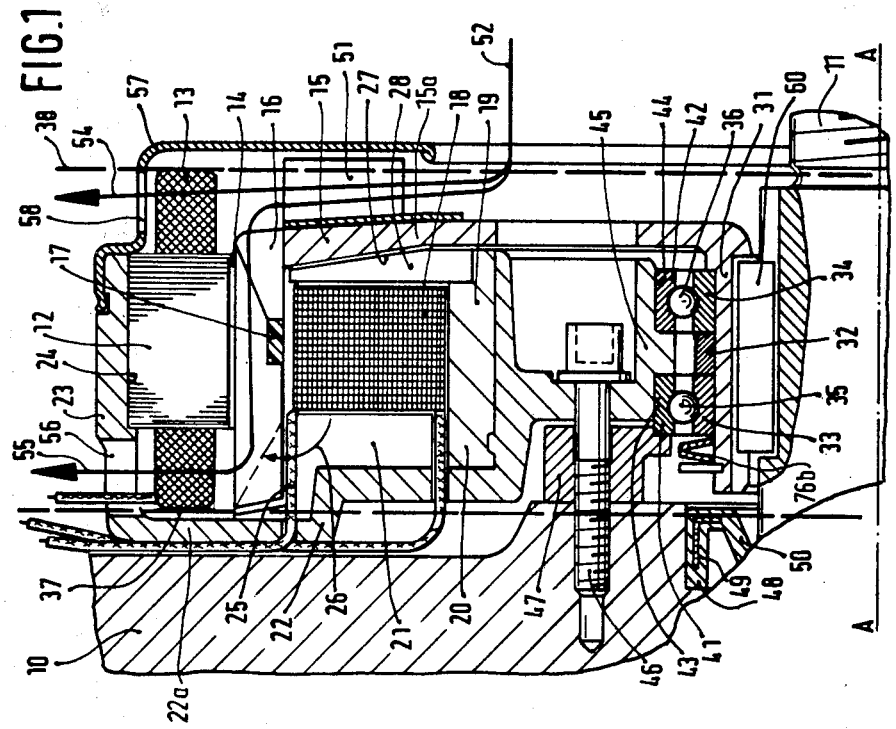

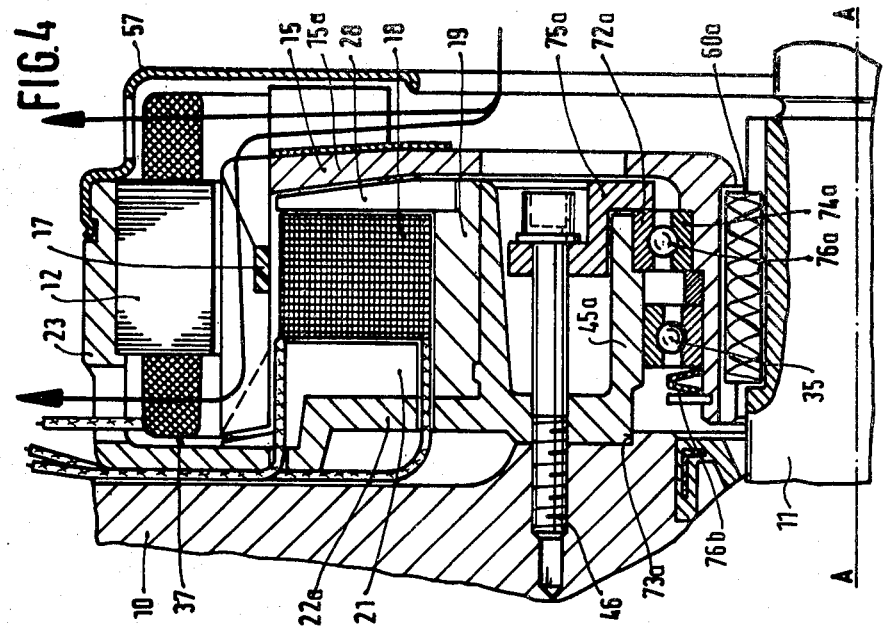
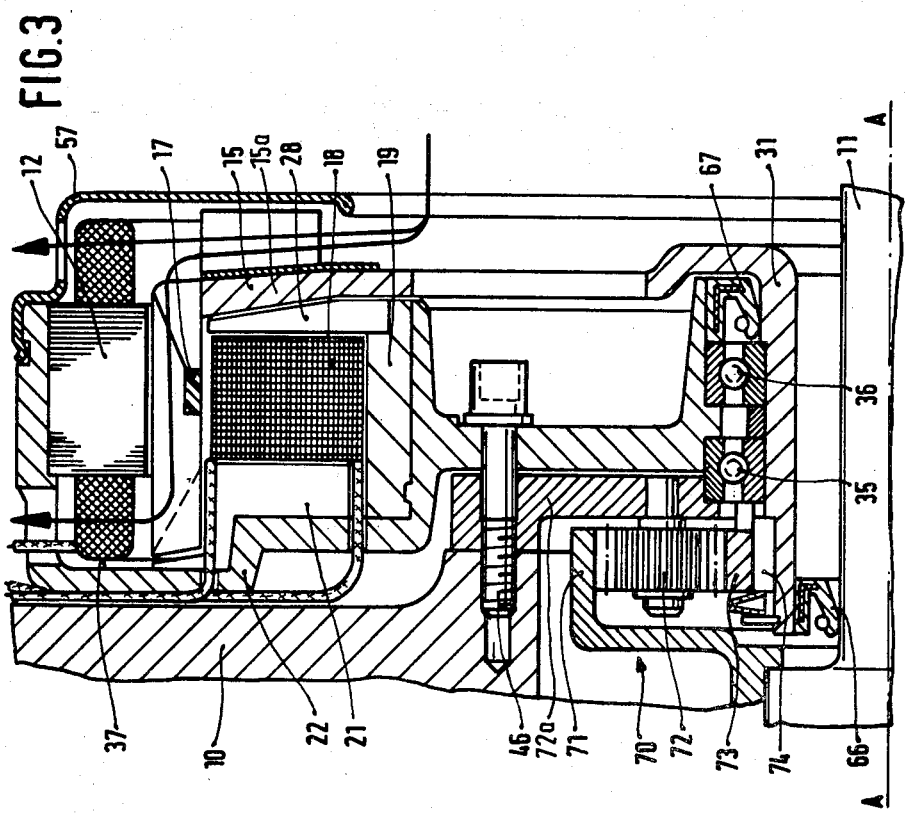

COMPACT ALTERNATOR FOR A SELF-CONTAINED ON-BOARD ELECTRIC NETWORK, PARTICULARLY FOR AN AUTOMOTIVE VEHICLE

REFERENCE TO PRIOR ART

German Patent Disclosure Document DE OS No. 29 35 929

The present invention relates to an alternator, and more particularly to an alternator construction which is compact and axially short, suitable to provide electrical power for an on-board electrical self-contained network, for example for an automotive vehicle. Due to its short axial length, the alternator is particularly suitable for installation, for example, in a clutch housing, or for direct coupling to an automotive engine.

BACKGROUND

Slip-ring-less three-phase alternators are known (see, for example, German Patent Disclosure Document DE OS No. 29 35 929). Such alternators use a magnetic field generating element, current through which may be controlled, for example by a voltage regulator, which is stationary; an armature winding is located concentric with the field. The field generating element is coupled through a narrow air gap with a flux guide element, for example in form of a claw pole structure which, alternately, presents North and South Poles to the stationary armature. Thus, the only portion which is rotating is a flux guide element, so that the field structure can be directly connected to the voltage regulator. In such alternators, for example as disclosed in the German Patent Disclosure Document referred to, the shaft which secures the flux guide element is mounted in a first ball bearing which is positioned within an end plate of the alternator, for example adjacent to a drive pulley; a second ball bearing is mounted in a second bearing plate which, typically, is cup-shaped. The space between the flux guide and available within the cup-shaped second bearing plate may be used to support rectifier diodes and accessory electrical equipment to provide direct current output to a vehicle battery. The armature lamination stack is clamped between the first and second bearing plate, and held under radial and axial tension.

THE INVENTION

It is an object of the present invention to provide an alternator which is essentially maintenance free, and which is of extremely short axial dimension, so that it may be located, for example, within the clutch housing of an internal combustion (IC) engine of a motor vehicle, or, for example, to be mounted between the engine block of such a vehicle and a belt pulley which drives various accessories of the vehicle.

Briefly, the alternator is of the slip-ring-less type. The claw pole structure is coupled to the shaft, for example by an elastic coupling or via a planatary gearing, to be driven by the shaft. The claw pole structure is formed with an in turned element, extending inwardly, and concentrally within the field structure to form a hub which, at its outer circumference, carries roller-type bearings, typically two ball bearings which retain the claw pole structure, and hence the shaft coupled thereto in position with respect to the stationary portions of the alternator, which, preferably, includes a casting holding the field structure in place and additionally securing the armature windings in position, all axially aligned within two essentially parallel planes defining the longest axial dimensions of the armature windings. These axial dimensions are usually formed by the winding ends of the armature.

In accordance with an embodiment of the invention, the alternator can be air cooled and the rotor structure can carry from blades at the side remote from the claw poles or, alternatively, the claw poles can be shaped to, themselves, form fan turbine blades; In accordance with another embodiment of the invention, an oil cooling circuit can be provided, for example coupled to a pressurized oil supply of an IC engine which drives the alternator.

The rotor, in accordance with the present invention, thus is secured to the drive shaft, which is self retained, the drive shaft being merely guided by the bearings positioned within the outermost planes defining the axial extent of the stator windings. Thus, particularly desirable and narrow air gaps between the fixed field structure and the claw pole element can be provided, one of the gaps being radial and the other one axial, so that a large area of flux transfer through the air gaps is provided.

In accordance with a feature of the invention, an elastic coupling is interposed between the shaft driving the alternator and the rotor structure. Such an elastic coupling is particularly desirable if the drive shaft is secured in journal or slide bearings which are subject to wear in operation of the engine. Use of an elastic coupling permits absorption of tolerances and uneven running conditions of the drive shaft arising in operation of the engine in the course of its use and life, without interference with proper running of the alternator.

DRAWINGS

FIG. 1 is a half-axial cross section through an alternator in accordance with the present invention;

FIG. 2 is a view similar to FIG. 1, illustrating a modification;

FIG. 3 is a view similar to FIG. 1, illustrating another modification, using a planatary gear drive;

FIG. 4 is a view similar to FIG. 1, illustrating yet another modification which results in simplification of manufacture;

DETAILED DESCRIPTION

Figure 5:
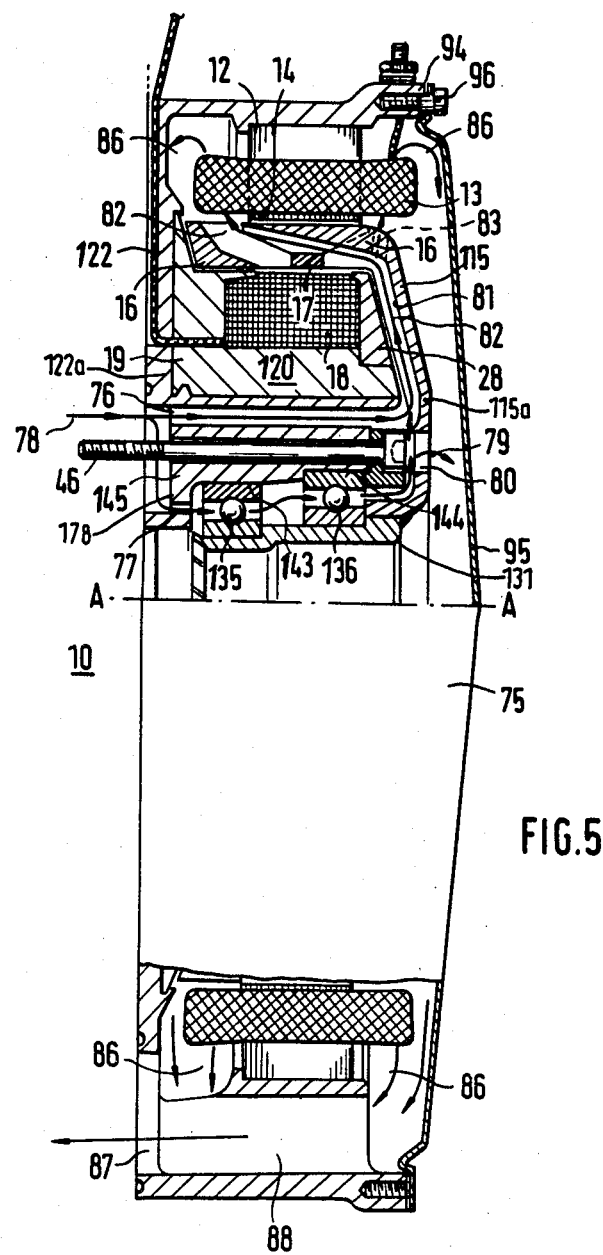
FIG. 5 is a fragmentary axial cross section through another embodiment of an alternator utilizing oil cooling, in which the upper half of the alternator is shown in detail and of the lower half only so much as is necessary for an understanding of the invention.

Only the alternator structure is shown, the rectifier portion to rectify alternating current derived therefrom, for example to charge a battery, voltage regulator, and other electrical components have been omitted. The rectifier structure and the voltage regulator structure preferably would be constructed as separate structural components, appropriately located to provide the necessary cooling therefore. A suitable installation, for example, would be within a cooled portion of the engine compartment of an automotive vehicle.

The generators illustrated, and selected as a specific example with which the invention will be described, are suitable to be driven by an internal combustion (IC) engine, for automotive use. The generator is adapted to be secured to a wall 10, which may be a portion of the wall structure of an IC engine, the clutch housing, a transmission housing or the like; or any other suitable housing structure from which a shaft 11 projects. The shaft 11, for example, is a stub shaft, which has its own bearings (not shown) internally of the IC engine, or other driving element. Shaft 11, for example, can be a portion of the engine drive shaft extending towards a clutch plate of a clutch housing.

The alternator has a ring-shaped laminated stator pack 12 which has armature windings 13 wound thereon, as well known. The stator is formed with a central bore 14, which defines a narrow air gap with respect to a claw pole flux guide element 15. The flux guide element 15 has a plurality of respectively oppositely polarized claw poles 16 extending circumferentially thereabout. The claw poles 16 are secured together by a ring 17 made of non-magnetic material to form a cylindrical pole structure.

An exciter or field winding 18 is located concentrically with respect to rotor 15 on a cylindrical portion 19 of a field structure 20, made of ferromagnetic material. A pole half or pole portion 21 is located on the structure 20 at the side thereof facing the housing wall 10. The field structure 20 is made of soft magnetic iron, for example as a screw machine element, and is surrounded by a cast carrier 22, made of light weight metal, such as aluminum for example. Carrier 22 is cup-shaped, and has a fit surface 24 at its outer wall 23. The fitting surface is accurately sized to provide a holding surface for the armature lamination stack 12.

The circumferential surface 25 of the pole portion 21 is located opposite the claw poles 16 with only slight radial air gaps therebetween. Field lines 16 will close the magnetic field generated by the exciter coil 18 via the armature lamination stack 12 if it is assumed that the generator is in a position of FIG. 1. In this position, the pole half 21 may, for example, be a North Pole. The return flow of the magnetic flux will extend over the oppositely poled claw poles 16 of the rotor 15 which is located with its inner surface 27 opposite the second pole half or pole portion 28 of the exciter or field system. The pole portion 28 is ring-shaped and press fitted on the cylindrical portion 19 which has a sleeve-like extension—see FIG. 1—and is spaced from the inner surface 27 of the claw poles by its narrow axial air gap.

The axial extent of the alternator structure is short. This short distance is defined, essentially, by two at least approximately parallel planes 37, 38, extending generally perpendicular to the axis of rotation A—A of the shaft 12. This short axial dimension of the generator is obtained by providing the bearings for the alternator within the distance defined by the planes 37, 38. The bearings are two ball bearings 35, 36 which are located within the rotor 15, which has an axially inturned portion. As can be seen from FIG. 1, the axial extent of the end turn of the armature windings, that is, the portion of the armature windings projecting beyond the stator stack 12 practically determines the axial size of the generator. The bearings are axially aligned with the radial air gaps.

The outer races 41, 42 of the ball bearings 35, 36 are secured in bores 43, 44 of a rub portion 45 formed on the support or carrier 22. The inner races 33, 34 of the ball bearings 35, 36 are located at the outside of the inturned portion of the flux guide claw pole rotor 15, forming a hub 31.

The alternator is secured to the wall 10 by a plurality of attachment bolts 46 which are located between the field structure 20 and the outer races 41, 42 of the ball bearings, and which retain the support structure 22 against the housing wall 10, with a spacer ring 47 interposed therebetween. The claw pole structure 15 is formed with openings to permit access to the bolts 46—see FIG. 1.

The alternator is cooled by a radial fan, formed by fan blades 51, made of bent sheet metal, and attached to the rotor 15, distributed around the circumference thereof. Air is sucked in through a central bore formed in a ring-shaped hood 57, as schematically illustrated by arrow 52. The air is blown over the projecting winding ends of the armature winding 13. The cooled air can lead the structure through a plurality of exit openings 55 formed in the outer portion 23 of the support structure 22, and through openings 58 formed in the ring-shaped closing hood or cover 57. The cover 57 can be held in position at the outer portion 23 of the support structure 2 by a circumferential inwardly extending bead which snaps into a matching groove formed in the support structure 23.

The rotor 15 is drivingly coupled to the shaft 11; in accordance with the embodiment of FIGS. 1, 2 and 4, an elastic coupling 60 is located between the rotor 15. The hub portion of the rotor, thus, is constructed in form of a hollow shaft, with couplings 60 interposed between the hollow shaft portion and the shaft 11. The elastic coupling compensates for inaccuracies in running and centricity of shaft 11, which may arise in the course of operation of the engine driving the alternator, and such other equipment as may be coupled thereto, for example a drive pulley, and clutch portion or the like. The elastic coupling may, for example, be an elastic ring, or may be constructed in accordance with well known elastic coupling arrangements e.g. a corrugated web coupling 60a (FIG. 4).

EMBODIMENT OF FIG. 2

Generally, the structure is similar to that of FIG. 1; the difference, however, is that a pair of sealing rings 66, 67 are provided, located between the shaft 11 and the inner bore 68 of the hub portion 31 of the rotor 15 on the left side, and between the outer wall of hub portion 15 of the rotor and the bore 44 in the hub portion 45 of the lightweight metal carrier 22, retaining the outer race 42 of ball bearing 36.

EMBODIMENT OF FIG. 3

The general structure is similar to that disclosed in FIG. 1; the basic difference is that the elastic coupling 60 between the generator shaft 11 and the hub 31 of the claw pole structure is replaced by a planetary drive 70. Planetary drive 70 has an outer internally geared wheel 71, secured to the shaft 11 for rotation therewith. A plurality of planet wheels of 72 are secured to a carrier ring 72a which, in turn, is secured to the fixed carrier 22, and hence to the wall 10, and also forms the spacer element—see spacer 47 FIG. 1—between the carrier 22 and the wall 10. Rotation is transmitted to the sun gear 73 which is connected in driving relation to the hub 31 of the rotor 15 by a spline 74.

The respective embodiments of FIGS. 2 and 3 readily permit including the bearings 35, 36 within the pressurized lubrication circuit of the driving IC engine.

EMBODIMENT OF FIG. 4

This structure is particularly simple to manufacture since all concentrically located diametrical openings of the rotor and the generator, which are stationary, can be machined with a single setup. A clamping element, in form of a ring 75a is provided. The carrier 22a, itself, is formed with a seating shoulder 73a, adapted for seating within a matching circumferential abutment formed on the block 10, concentric with shaft 11. The central opening within the hub portion 45a of the carrier 22a has two steps, and the ball bearings are located in the respective step openings. This permits easy boring and reaming from one side, with the carrier 22a clamped but once in a rotary machine tool, for example a turret lathe or the like. The outer race 72a of ball bearing 76a is seated in a slightly enlarged outer opening, the inner race 74a is seated in an elevated ring portion on the claw pole rotor structure 15. A double dished spacer ring 76b maintains the bearings in position, with an interposed spacer, as clearly appears in FIG. 4.

EMBODIMENTS OF FIGS. 5-8

The basic construction of the alternator 75, e.g. for three phase, is similar to that of FIG. 4, but arranged for oil cooling. The generally cylindrical carrier 122 is designed for attachment by bolts 46 to a wall, similar to wall 10 of an IC engine, a transmission, a clutch, or the like. The exciter system 120 for the rotor 115 of the claw pole structure 16 is generally similar to that of the embodiment of FIGS. 1-4, but arranged for forced oil circulation for cooling. The rotor 115 is journaled by two bearings 135, 136, which are of different radial dimensions in the hollow hub 145 of the carrier 122. The outer race of bearing 135 is seated in the bore 143 of the rotor 115. The outer race of bearing 136 is seated in an enlarged bore 144, concentric with bore 143. The hub 145 of the carrier 122 is additionally formed with bores 76, 77 which are spaced circumferentially about the center of rotation defined by the axis A—A. Cooled, fresh oil is supplied to bores 76, 77, as shown by arrow 78. The oil can distribute between the two bores 76, 77 in a ring-shaped chamber 178 formed by a recess defined by an axial setback of the rotor 115. A portion of this oil is immediately delivered to the two bearings 135, 136. A partial oil stream 79 can leave the region of the bearings through an opening 80. The bore 76, which are parallel to the axis A—A of the rotor 115 terminate in essentially radially extending cooling ducts 81. They are moved outwardly by centrifical force, similar to a slinger to form a strong stream 82 for passage between the claw poles 16, and for being flung against the end portions of the winding 30.

Radial bores 83, communicating with the cooling ducts 81 are provided in the connection zone of the claw poles with the essentially axially extending portion of the rotor 115 to provide for oil spray against the winding ends of the armature windings 13. The bores 83 extend essentially radially and provide for a strong flow of cooling oil, as schematically indicated by arrow 86 which impinges the end portions of the armature winding 13 and thus provide for effective cooling of the armature winding. The cooling oil, which has now been heated by contact with the potentially hot windings can collect in a sump 88—see lower portion of FIG. 5—to be then drained through a drain opening 87, connected, for example, to the oil circuit of the IC engine.

Figure 6:
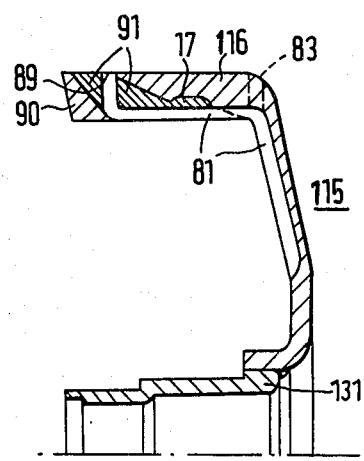
FIG. 6 is a fragmentary side view of an oil cooling circuit within a claw pole structure.

FIG. 6 is a schematic cross section of half of the claw pole rotor 115. The two claw pole elements which, together, form the entire claw pole structure are connected by a pressure injection casting 91, made, for example, of aluminum, but it may be made of synthetic resin; they are thereby securely connected together. The injection casting 21 is so arranged that the cooling ducts 81 are formed therein, and that oil can pass through the openings 83, 89 located beneath, or directed towards the winding ends of the armature windings 13.

EMBODIMENT OF FIG. 7

Figure 7:
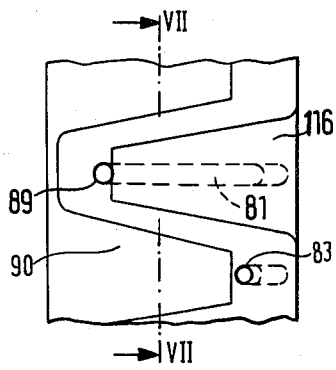
FIG. 7 is a schematic top view of an oil cooling circuit.
Figure 7A:
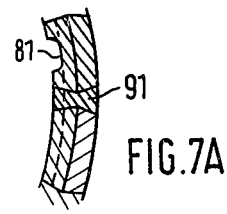
FIG. 7A is a fragmentary side view along section VII—VII of FIG. 7.
Figure 8:
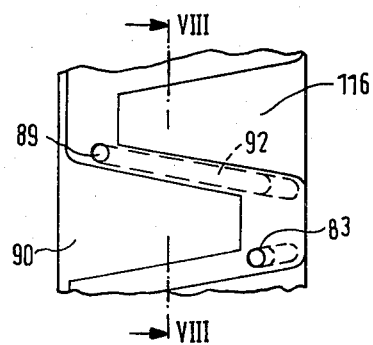
FIG. 8 is a fragmentary top view of the claw pole structure showing another oil circuit.
Figure 8A:
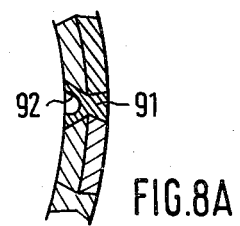
FIG. 8A is a fragmentary side view of the embodiment of FIG. 8 along section VII—VII of FIG. 7.

Various arrangements of the cooling ducts may be used. As illustrated in FIG. 7, and 7A, the openings 81 are grooves, which, circumferentially alternating, end in bores 83, or 89, respectively in the pole gaps, or at the tips of the claws—see FIG. 7. FIG. 7A is a section along line VII—VII. The claw pole ring 90 (see FIGS. 6, 7) can, alternatively, be connected with the claw pole ring which includes the claw poles 116 by a non-magnetic ring, similar to ring 17 (FIGS. 1-4), rather than by a casting 91. The oil which leaves from the ends of the grooves 81 is thrown by centrifugal force, acting on the oil particles against the end portions of the windings 13 of the stator stack 12.

EMBODIMENT OF FIG. 8

The grooves 81 communicate with longitudinal grooves 92 formed within the casting material 91, and extend in the non-magnetic casting material, thereby not interfering with the presence of magnetic material of the claw poles 116 which might cause degeneration of harmonics which may have to be filtered to prevent interference with communication equipment.

The oil cooling utilizes centrifugal force. Even foaming, which may occur due to the highly fissured rotating machine components will not interfere with oil transport to the armature winding end portions, and hence effective cooling. If the axis A—A of the rotor shaft is essentially horizontal, so that cooling oil can drip down from the upper portion of the ends of the armature windings, it will be flung back, at least in part, to the windings. The cooling ducts 81 are intended to prevent flooding of the air gaps. This is entirely feasible if the housing of the generator has a substantially wide or large diameter drain opening 87—see FIG. 5—or if the claw pole structure 115 is so constructed—see FIG. 6—that the oil in the ducts 81 will be directly guided to the radially extending openings 83, 89 respectively.

Cooling of the exciter coil 15 is effected through the fresh oil supply which is guided in bores 76. The bearings are cooled by oil flow through the opening 77.

The claw pole structure 15, 115 need not have a hollow shaft, connected by a coupling, such as the resilient coupling 60, or the planatary gearing of FIG. 3 to the shaft 11. It may, also, have a hollow shaft which is seated directly on the shaft 11 and coupled thereto. Desirably, however, the claw pole rotor is driven from the shaft 11 over a coupling which compensates for play which will result upon run-in of the bearings, and wear of the bearings in time; this coupling should preferably be so arranged that wear on the bearings will not affect the air gaps arising within the alternator. Any suitable slightly resilient and wear compensating coupling may be used in accordance with well known and suitable engineering design.

The embodiment of FIG. 5 is so arranged that the free end portion 94 thereof is covered by a sheet metal cover 95, which is attached thereto in sealed relationship, for example by screws 96, in order to prevent oil leakage therefrom; the cover 95 is not strictly necessary, however, and the alternator can be arranged for attachment within a structure which includes an oil tight cover. For example, the alternator may be attached to a transmission and included within a transmission fluid washed portion thereof; the rotor shaft then could be coupled to a solid shaft, or stup shaft within the transmission, for example by a spring loaded spline connection which provides for long-time positive coupling without transfer of running inaccuracies arising due to wear in the bearings to the rotor structure which might interfere with the proper arrangement and placement of the air gaps.

The alternator, thus, can be constructed of axially compact form. The carrier structure 22, 122, defines therein a cylindrical cavity, concentric with the axis of rotation A—A of the alternator. The armature structure includes an armature core 12, and three phase armature windings 13, both located in the cavity. An essentially cylindrical exciter or field winding structure 20, 120, having a diameter less than the inner diameter of the armature core is located in the cavity. The field structure defines a flux path gap with the core, concentrically with respect to the alternator. A field winding is provided in the field structure, adapted for connection to a voltage regulator, as well known. A claw pole rotor 15, 115, with claw pole 16 (FIGS. 1-4; 16, 90, 116, FIGS. 5-8) is located in the flux path gap, spaced from the outer circumference of the cylindrical field structure by an inner air gap, and from the inner circumference of the armature core by a second air gap.

The particularly axially compact structure is made possible by so constructing the carrier structure 22,122 that it has a radially extending portion 22a, 122a, adapted for attachment to an engine block 10, or the like, and an outer axially extending cylindrical portion 23, which surrounds and defines the cylindrical cavity; and a further axially extending cylindrical portion 45, 145, which projects axially concentrically to the shaft. The rotor 15, 115 includes a radially extending portion 15a, 115a, located at the axial end face of the machine opposite the axially extending portion 22a, 122a of the carrier structure. Attached to the radially extending portion is a reentrant portion 31, 131, located beneath the exciter or field structure 20, 120, and forming a hub. The hub is rotably coupled to the drive shaft, for example by a flexible coupling 60 (FIGS. 1, 2, 4) or a planetary drive 70 (FIG. 3) which can also provide for speed change between the shaft and the rotor. Bearings, that is, ball bearings 35, 36; 35, 76a; 135, 136 are located between the outer circumference of the hub 31, 131 formed by the reentrant portion of the rotor and the inner cylindrically extending portion 45, 145 of the carrier structure 22, 122. The construction, thus, permits placing the bearings within the planes 37, 38 (FIG. 1) so that the axial lengths of the alternator is essentially limited only by the axial extent of the windings 13 of the armature, with no additional axial space being needed for bearings and other support structures.

Various changes and modifications may be made in the features described in connection with any one of the embodiments may be used with any others, within the scope of the inventive concept.

In an operating example, the inner diameter of the core 12 was 159.5 mm, the outer diameter of the field structure 137 mm, and the thickness of the claw poles 10.5 mm, leaving axial air gaps between the field structure and the armature core of 0.5 mm, and a radial air gap adjacent pole piece 28 of 0.6 mm. The ball bearings have inner and outer races of 30/55 mm and 35/62 mm diameter. The machine operated as a 18 pole machine with three armature windings connected to a not shown three phase rectifier. Rated power output of the alternator, when coupled to an automotive type IC engine was: 1200 VA.

We claim:

1. Alternator for a self-contained electrical network, and adapted for coupling to a drive shaft (11) of a variable speed drive engine having a carrier structure (22, 122) defining a cylindrical cavity therein;

an armature structure including an armature core (12) and an armature winding (13) located in said cavity;

an essentially cylindrical exciter or field structure (20, 120) having a diameter less than the inner diameter of said armature core (12) to define a flux path gap therewith, concentrically located in said cavity and secured to said carrier structure, and including a field winding (18);

a claw pole rotor (15) having claw poles (16; 90, 116) located within said flux path gap and spaced from the outer circumference of the cylindrical field structure by an inner air gap, and from the inner circumference of the armature by a second air gap;

wherein, in accordance with the invention the carrier structure (22, 122) includes a radially extending portion (22a, 122a) adapted for attachment to a fixed support, an outer axially extending portion (23) surrounding said cylindrical cavity, and an inner axially extending cylindrical portion (45, 145) projecting concentrically to the shaft (11);

the rotor (15, 115) includes a radially extending portion (15a, 115a) and a re-entrant portion (31, 131) located beneath the exciter or field structure (20, 120) and forming a hub;

means (60, 70) are provided rotatably coupling the hub to the engine drive shaft (11);

and roller-type bearings (35, 36; 76a; 135, 136) are provided located between the outer circumference of the hub and the inner cylindrically extending portion (45, 145) of said carrier structure (22);

wherein the armature windings (13) has outer end portions which are located between two planes (37, 38) extending essentially at right angles to axis of rotation (A—A) of the rotor;

and wherein the bearings are located between said planes whereby the axial thickness of the alternator is essentially defined by said planes and limited, essentially, to the axial extent of said armature windings (13).

2. Alternator according to claim 1 wherein the carrier structure (22) comprises non-magnetic material and the exciter or field structure comprises a core (19) about which said field winding (18) is wound, the carrier structure being cast around the exciter or field structure.

3. Alternator according to claim 1 wherein the exciter or field structure (20, 120) comprises a pole piece (21) having a cylindrical circumference (25);
and the claw pole rotor has a set of claw poles corresponding to the one pole of the exciter or field structure formed by said pole piece (21), spaced therefrom by a narrow radial air gap.

4. Alternator according to claim 3 wherein the claw pole pieces facing said one pole piece (21) have, in developed planned view, essentially triangular shape, with the base of the triangle facing said one pole piece to increase the cross sectional area of the flux path between the pole piece and the respective claw pole.

5. Alternator according to claim 1 wherein the exciter or field structure (20, 120) comprises a radially extending pole piece (28) having a radial flux transfer surface;
and the radially extending portion (15a, 115a) of the claw pole rotor is spaced from said radially extending portion of the exciter or field structure by a narrow air gap.

6. Alternator according to claim 1 wherein said re-entrant portion (31, 131) of the rotor (15, 115) and forming the hub is hollow, and spaced from the shaft (11), to form a hollow shaft-like hub;
and the shaft (11) extends through said hollow shaft-like hub.

7. Alternator according to claim 6 further including a torque transmission coupling (60) interposed between the shaft (11) and the interior of the hollow shaft-like hub (31, 131).

8. Alternator according to claim 7 wherein the torque transmission coupling comprises an elastic coupling.

9. Alternator according to claim 7 wherein said elastic coupling comprises a corrugated web coupling.

10. Alternator according to claim 6 further including the drive shaft (11) and the hollow shaft-like hub (31, 131).

11. Alternator according to claim 6 including a gear drive coupling the re-entrant portion (31, 131) of the rotor (15, 115) to the shaft (12).

12. Alternator according to claim 11 wherein said gear drive comprises a planetary gear (70, 71, 72, 73, 74).

13. Alternator according to claim 6 further including (FIG. 2) at least one sealing ring (66, 67) located within the hollow shaft-like hub (31, 131), and seated on the shaft (11) of the generator; and
the roller-type bearings comprise two ball bearings (35, 36), one (66) at the sealing rings being located axially outside and adjacent one of the ball bearings (36), and the other sealing ring being located adjacent the other ball bearing (35) and between the shaft (11) and the interior of the hollow shaft-like hub (31).

14. Alternator according to claim 1 further including a plurality of axially extending fan blades (51) secured to the rotor (15, 115) and extending axially outwardly from the rotor essentially within the confines of the plane (38) adjacent the terminal ends of the rotor windings (13) adjacent said fan blades.

15. Alternator according to claim 1 further including (FIGS. 5-8) a plurality of cooling liquid ducts (76, 77) connected for supply of cooling liquid (78) to the alternator;
and cooling liquid distribution ducts (81) formed on the rotor, in liquid communication with said cooling liquid ducts and extending radially with respect to the shaft of the alternator, to move cooling liquid towards the armature windings (13) by slinger operation.

16. Alternator according to claim 15, further including exit openings, (83, 89) formed in the rotor extending radially outwardly, in communication with the cooling liquid distribution ducts, and located in essential axial alignment with the winding ends of the armature windings (13) to provide cooling liquid spray thereagainst.

17. Alternator according to claim 13, wherein the cooling liquid ducts include a bearing cooling supply duct (77) to supply cooling liquid and lubrication to the roller-type bearings (135, 136).

18. Alternator according to claim 17 wherein the roller-type bearings comprise two ball bearings of different internal and external diameters to permit machining access to seating surfaces of the races of the ball bearings.

19. Alternator according to claim 11 wherein the roller-type bearings comprise two ball bearings of different internal and external diameters to permit machining access to seating surfaces of the races of the ball bearings.

20. Alternator according to claim 15 wherein the cooling liquid distribution ducts (81) are positioned, at least in part, on the inside of the axially extending portion of the claw pole rotor.

21. Alternator according to claim 20 wherein the claw pole rotor comprises two magnetic claw pole structures (90, 116);
and an non-magnetic filler material (91) filling the space between the non-magnetic claw pole structures.

22. Alternator according to claim 19 wherein said filler material comprises cast material consisting of at least one of: cast aluminum; cast resin;

23. Alternator according to claim 21 wherein (FIG. 8) the liquid distribution ducts (81) extend at least in part within the non-magnetic filler or casting compound (91);
and radially extending exit openings (83, 89) extend through the non-magnetic filler (91) in essential axial alignment with the end portions of the armature windings (13) to provide cooling liquid thereto.

24. Alternator structure for assembly to an end wall (10) of a drive means having a drive shaft (11) projecting therethrough, the alternator having a carrier or support structure (22, 122);
an armature structure (12) including armature windings secured to the carrier or support structure;
an essentially cylindrical exciter or field structure (20) secured to the carrier or support structure within the armature structure;
and a claw pole rotor (15, 115) interposed, radially, between the exciter or field structure and the armature structure,
wherein, in accordance with the invention, and to reduce the axial length of the alternator
the carrier structure (22, 122) includes a radially extending portion (22a, 122a) adapted for attachment to the wall of the drive means, and
a ring-shaped axially extending portion (45, 145) radially inwardly of the exciter or field structure;
the rotor includes a radially extending portion (15a, 115a), and a ring-shaped axially extending portion (31, 131), in essential axial alignment with the axially extending portion of the carrier structure;

and roller-type bearing means (35, 36; 76a; 135, 136) located between the axially extending portions of the rotor and the carrier structure;

and means (60, 70) are provided coupling the rotor to said shaft;

and wherein the armature windings (13) has end portions which are located between two planes (37, 38) extending essentially at right angles to the axis of rotation (A—A) of the rotor, the bearings being located between said planes, whereby the axial thickness of the alternator is essentially defined by said planes.

25. Alternator structures according to claim 24 wherein said axially extending portions comprise radially stepped zones, and the roller-type bearings comprise ball bearings located, respectively, in axially aligned radially stepped zones.

26. Alternator according to claim 24 wherein the bearings are ball bearings, and positioned in essential axial alignment with radial air gaps between the field structure (20, 120), the claw pole rotor (15, 115) and a core (12) of the armature (12, 13).

* * * * *